Sept. 20, 1971  E. A. DONEGAN  3,605,924
DRILL BIT
Filed Aug. 26, 1969  2 Sheets-Sheet 2
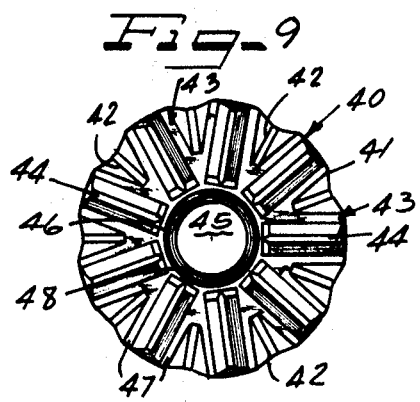
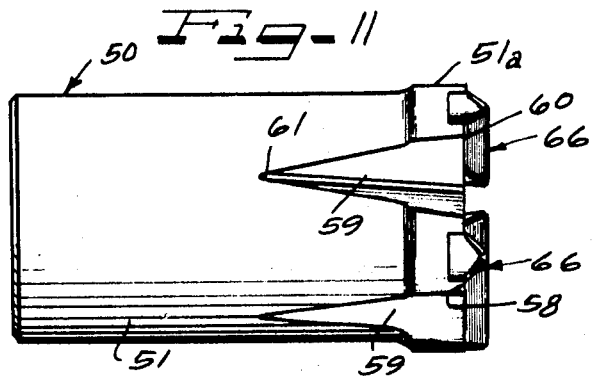
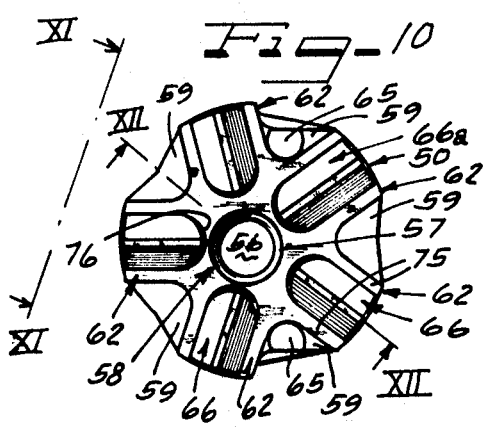
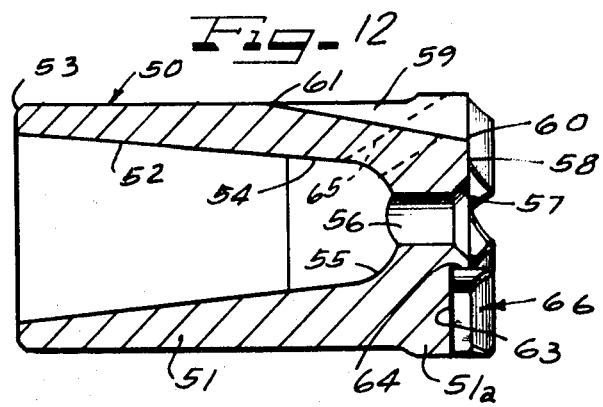
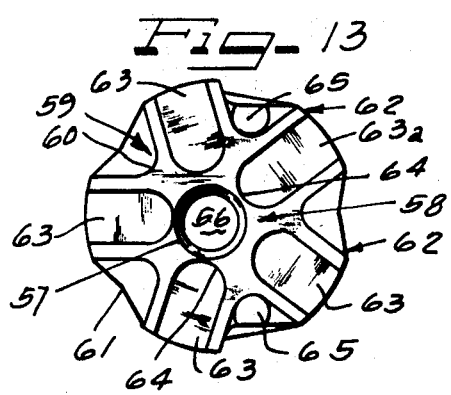
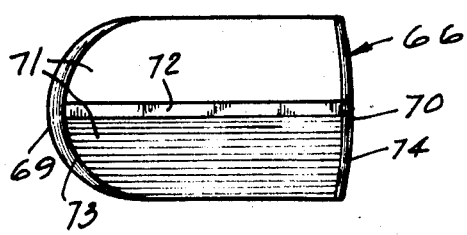
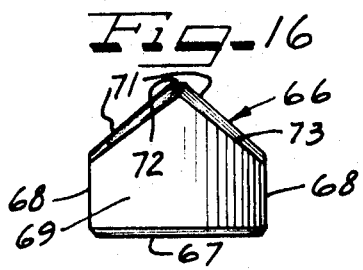
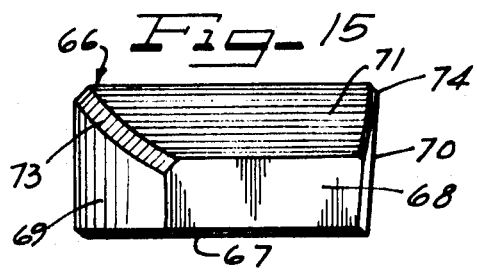
INVENTOR.
EDWARD A. DONEGAN
BY  ATTORNEYS United States Patent Office 3,605,924
Patented Sept. 20, 1971

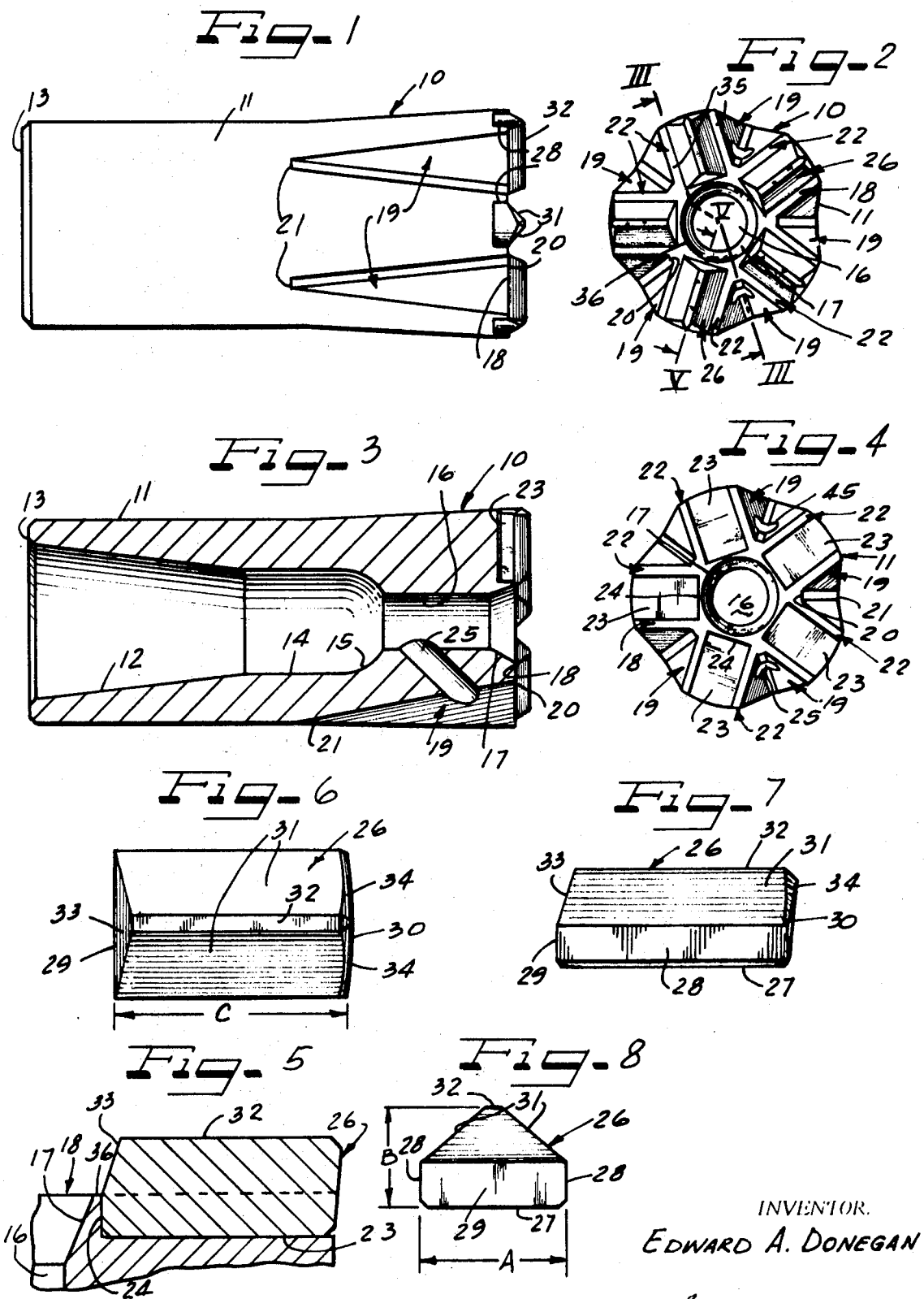

3,605,924
DRILL BIT
Edward A. Donegan, St. Catharines, Ontario, Canada, assignor to Thompson Products, Ltd., St. Catharines, Ontario, Canada
Filed Aug. 26, 1969, Ser. No. 853,051
Int. Cl. E21c 13/01, 13/06
U.S. Cl. 175—400      12 Claims

ABSTRACT OF THE DISCLOSURE

A single pass percussion drill bit having from five to nine wings around a central hole, each carrying a shallow, wide, hard insert tooth in a flat narrow end face thereof and having free flow chip discharge passages between the teeth. The bit body has a flat front face with a separate slot for each insert, and each insert has its inner end butted against a shoulder at the inner end of the slot. The inserts are wide and shallow to provide maximum cutting faces with minimum material, may be of the same or different lengths, and will be spaced in accordance with the placement of a central flushing hole and chip clearance grooves in the bit body.

BACKGROUND OF THE INVENTION

Field of the invention

This invention relates to the art of percussion drill bits having insert slugs of hard refractory cutting material forming the cutting teeth or edges. Specifically, the invention pertains to the art of increasing the wear life and cutting capacity of percussion drill bits which are not intended to be reconditioned or resharpened to prolong their useful life.

Description of the prior art

Conventional percussion drill bits have four wings, each with its own cutting edge and arranged in Gothic arch shape, although the prior art does has some disclosures of percussion bits with five cutting edges as, for example, in the Phipps U.S. Patent 2,507,222 dated May 9, 1950. Large percussion drill bits with concentric rings of six circumferentially spaced cutting edges are shown in the Hjalsten U.S. Patent 2,884,227 granted Apr. 28, 1959. In this prior art, however, the inserts or slugs of hard cutting material, such as tungsten carbide, had to be relatively deep axially and relatively narrow perpendicular to their depth to provide for high-angle cutting edges and side walls of sufficient extent to adequately support the inserts in the wings of the bit body. The end faces of the inserts were fully exposed, and the only support was obtained through the side faces of the inserts. The deep inserts required deep supporting wings, thereby increasing the essential length of the bit body. The supporting wings also had to be of considerable width to provide adequate supporting walls for the side faces of the inserts. These deep and wide wings interfere with free flow of chips from the cutting edges, and increases in the number of cutting edges from four to five or six further blocked available flow paths for the chips, especially in small diameter bits.

SUMMARY OF THE INVENTION

The useful life of single pass percussion drill bits, in medium to hard rock, is directly related to the ability of the bit to withstand gauge, or outside diameter wear, is governed by the rate of wear at the outside corner zones of the cutting edges. While improvement in wear life might be expected with the number of outside corners of the cutting edges increased, this increase has heretofore interfered with the free flow of the chip material away from the rock face. The cutting edges of percussion drill bits are usually formed of expensive hard material inserts, such as sintered slugs of tungsten carbide, in a binder of other metals such as cobalt. These inserts or slugs are brazed or soldered to the drill bit body, and must be adequately supported to resist the impact and shear loads encountered in rock drilling.

The present invention now provides single pass percussion drill bits with a maximum number of outside corner zones to improve guage wear. These bits have adequate chip clearance, minimize carbide insert costs by reducing the depth and length of the insert slugs to obtain an optimum balance between gauge and face wear, and minimize wing depth requirements, thus shortennig the required length of the bit body. The wings of the bit body have flat end faces, each slotted to receive the inserts and each providing an abutment shoulder for the inserts at the inner ends thereof to strengthen the bond joining the insert and the wing. Since the ends of the wings are not bevelled or tapered as in the prior art, the wings can be quite narrow and still afford adequate side support for the shallow inserts.

The inserts may have less depth than width, and from five to nine are used, giving maximum cutting edges and corners with minimum insert material. The bit bodies have central flushing holes through the end faces, and the inserts preferably extend radially outwardly from the central hole, although tangential insert alignments are also within the scope of this invention. The inserts may be of the same length or may have different lengths, but do not extend beyond the center of the end face of the bit.

Flushing holes may also be provided in the side faces of the bits between the wings.

It is then an object of this invention to provide percussion drill bits with maximum cutting edges and minimum amounts of cutting edge materials.

Another object of the invention is to provide a single pass percussion drill bit with five to nine shallow cutting edge forming inserts, each carried in a separate wing separated from adjacent wings by enlarged grooves affording adequate chip flow.

Another object of this invention is to provide a percussion drill bit having a multi-winged bit body with a flat end face and a shallew carbide insert in each wing projecting from the flat end face to provide spaced cutting teeth thereon.

Another object of this invention is to provide a single pass percussion drill bit with carbide insert cutting teeth brazed in an end face of the bit body around a central hole, and providing from five to nine gauge cutting edges.

Another object of this invention is to provide a single pass percussion drill bit having a multi-winged bit body, a flat end face, a central hole in the end face, radial slots in each wing in the end face with rounded inner ends and carbide inserts brazed into the slots providing inner cutting corners around the hole and outer cutting corners around the wings.

Other objects, features and advantages of this invention will be readily apparent from the following description of certain preferred embodiments thereof, taken in conjunction with the accompanying drawings, although variations and modifications may be effected without departing from the spirit and scope of the novel concepts of the disclosure.

BRIEF DESCRIPTION OF THE DRAWINGS

FIG. 1 is a side elevational view of one form of drill bit according to this invention;

FIG. 2 is a top plan view of the bit of FIG. 1;

FIG. 3 is a cross-sectional view taken generally along the line III—III of FIG. 2;

FIG. 4 is a top plan view of the bit of FIGS. 1–3 with the cutting tooth inserts omitted;

FIG. 5 is an enlarged fragmentary cross-sectional view along the line V—V of FIG. 2;

FIG. 6 is an enlarged plan view of one of the cutting tooth inserts;

FIG. 7 is a side elevational view of the insert of FIG. 6;

FIG. 8 is an inner end elevational view of the insert of FIGS. 6 and 7;

FIG. 9 is a top plan view of a modified drill bit with nine cutting teeth, according to this invention;

FIG. 10 is a plan view of another form of drill bit, according to this invention, with five cutting teeth, including one elongated tooth;

FIG. 11 is an elevational view of the bit of FIG. 10 taken along the line XI—XI of FIG. 10;

FIG. 12 is a cross-sectional view of the bit of FIGS. 10 and 11 taken along the line XII—XII of FIG. 10;

FIG. 13 is a view similar to FIG. 10, but with the cutting tooth inserts removed;

FIG. 14 is a plan view of a cutting tooth insert for the bit of FIGS. 10–12;

FIG. 15 is a side elevational view of the tooth insert of FIG. 14;

FIG. 16 is an end elevational view of the tooth insert of FIG. 14.

DESCRIPTION OF THE PREFERRED EMBODIMENTS

The percussion drill bit 10 of FIGS. 1–3 includes a forged metal body 11 of generally cylindrical shape. The body 11 has a tapered core 12 converging inwardly from the bottom end 13 thereof to a cylindrical bore 14 with a rounded end 15 converging to a smaller diameter cylindrical hole 16 extending to a tapered mouth 17 in the flat end face 18 of the body. The bore 12 is adapted to be wedge-fitted onto the end of a percussion drill rod or impact tool. If desired, of course, the hollow interior of the body 11 could be internally threaded for threaded connection to the percussion tool.

The body 11 has five equally circumferentially spaced tapered grooves 19 around the periphery thereof. These grooves extend axially and are deepest and widest at the flat head end 18 of the body. Each groove is triangular shaped in cross-section, with an apex 20 at the head end closely adjacent the tapered mouth 17 of the hole 16, and from this apex 20 slopes axially inward and radially outward to a bottom end point 21 at the periphery of the body 11.

In the embodiment of FIGS. 1–3 five grooves 19 are provided, and they divide the flat end face 18 of the body into five wings 22 surrounding the central hole 16 and extending radially outward therefrom.

As best shown in FIG. 4, each wing 22 has a slot 23 extending radially inward from the periphery of the body 11 to an end wall or shoulder 24 which, as illustrated in FIG. 5, is very closely adjacent the tapered mouth 17 of the hole 16, and almost merges with the large end of the tapered mouth 17.

The slots 23 are quite shallow, are wider than deep, longer than wide, and have flat bottoms, as shown in FIGS. 3 and 5.

Two of the grooves 19 have flushing holes 25 drilled at a downwardly sloping angle from near the top ends of the groove into the center hole 16, as shown in FIG. 3.

Each slot 23 receives a pre-formed hard metal insert 26 to form the cutting edges or teeth for the bit. These inserts are preferably composed of a sintered tungsten carbide or the like refractory cutting material, and are braze-bonded or silver-soldered into integral relation with the slot walls.

The inserts 26, best shown in FIGS. 6–8, are generally rectangular slugs, each with a flat bottom 27, vertical parallel side walls 28, a flat vertical front end wall 29, and an arcuate outer end wall 30. The top of each insert 26 has inclined side walls 31 extending at angles of about 45° from the top ends of the vertical side walls 28 to a flat apex or ridge 32 extending longitudinally along the length of the insert. The inner ends of these tapered walls 31 are beveled, as at 33, to the end face 29. The outer ends of the tapered walls 31 are, likewise, chamferred or bevelled, as at 34, to the rounded end wall 30.

As shown in FIG. 8, the width A of the insert 26 is greater than the height B and, as shown in FIG. 6, the length C is greater than the width A. It is preferred that the slope of the side walls 31 be flat with a maximum inclination of 45°. The depths and lengths of the slots 23 are just sufficient to receive the rectangular basis of the inserts, with the tops of the side walls 28 flush with the end face 18 of the body, with the end walls 29 butted against the end walls or shoulders 24 of the slots, and with the rounded outer ends 30 flush with the periphery of the body at the outer ends of the wings, as shown in FIG. 2.

As shown in FIG. 2, the cutting tooth inserts 26 are surrounded along their sides and at their inner ends only by very narrow flat rims of the flat end face 18. The side rims, identified at 35, extend only from the side walls 28 of the inserts to the top ends of the grooves 19, and are very narrow. The inner end rims 36 extend only from the inner end faces 29 of the inserts to the wide open end of the bevelled mouth 17. Therefore, the end face has very little area, and no resistance to chip flow from the cutting edges 31 of the insert teeth is encountered. Chips will be freely flushed from the cutting edges 31 to the grooves 19. At the same time, however, the rims 35 and 36, being flat ended, afford maximum support for the inserts 26, and the inserts can thus be very shallow, saving expensive carbide material, because they are amply supported by the side walls of the slots.

The provision of five inserts 26 greatly increases the cutting capacity and efficiency of the bit beyond that possible with conventional four-wing bits. The maximum wear of cutting edges on percussion drill bits occurs at the outer diameter of the bit, and since extra cutting edges are provided at this outer diameter by the use of five inserts, the ability to withstand gauge or outside diameter wear is greatly increased. Because the end face 18 of the bit body is flat, maximum insert supporting strength is obtained with minimum frontal area, and body material is also saved. The grooves 19 may be quite deep and extend almost to the flushing hole 16 to further reduce the frontal area of the bit body. At the same time, since the grooves are cut into the periphery of the bit body, and since the wings are flush with this periphery, maximum efficiency for the amount of body material is obtained.

The bevelled inner ends 33 of the inserts 26 and the bevelled outer edges 34 of these inserts cooperate with the bevelled mouth 17 of the hole 16 and with the grooves 19 in facilitating chip flow and preventing grinding of the chips. The flat cutting apex edge 32 of the inserts increases the strength by eliminating sharp cutting edges.

According to this invention, as many as nine cutting inserts may be used, and in the bit 40 of FIG. 9 the bit body 41 has nine axially-extending peripheral slots 42 providing nine wings 43 slotted as described in FIGS. 1–3, and each receiving an insert 44 as described. These inserts 44 are in equally-spaced relation, of equal length, and surround a central flushing hole 45 which is bevelled at 46. The end face of the bit body 41 is flat, and the inserts 44 are surrounded only by narrow rim edges 47 between the sides of the inserts and the grooves 42, and narrow rim edges 48 between the inner ends of the inserts 44 and the bevelled mouth 46 of the hole 45. Resistance to chip flow is thus minimized.

In the modification of FIGS. 11–16, a drill bit 50 is provided with a generally cylindrical bit body 51 substantially the same as the body 11 of the bit 10. Thus, the body 51 has a tapered bore 52 for wedge-fitting the end of the drill rod, which bore converges from an enlarged open end 53 to a smaller diameter bore or well 54 having a rounded end face 55 converging to a small diameter cylindrical flushing hole 56 in the central portion of the closed end of the bit. The hole 56 has a bevelled mouth 57 diverging to the inner ends of the cutting teeth. The body 51, however, has an enlarged end head 51a providing a larger gauge for the bit than the diameter of the main body portion 51, thereby providing clearance space behind the flat end face 58 of the bit body.

Five axially-extending slots 59 are spaced equally around the circumference of the bit body, and extend through the head 51a. Like the grooves 19 of the bit 10, these grooves 59 extend from a deep, wide end at the end face 58 having an apex 60, and slope axially downward and radially outward from this apex to a narrow bottom end 61 substantially spaced below the head 51a. These grooves 59 divide the end face 58 of the bit body 50 into five equally-spaced wings 62. Each wing 62 is slotted at 63 in the end face 58, and one slot 63a is longer than the remaining slots. Each slot 63 has an open outer peripheral end and a semi-cylindrical closed inner end 64 providing an upstanding shoulder. As in the case of the slots 23 of the bit 10, these slots 63 are, likewise, shallow, wider than deep, and longer than wide. The inner end walls 64 of the slots are closely adjacent the mouth 57 of the bore 56, and since the slot 63a is longer than the remaining slots, it will be noted from FIGS. 10 and 13 that the hole 56 is eccentrically positioned in the end face of the bit body.

Two of the grooves 59 have flushing holes 65 drilled therethrough at a downwardly-sloping angle from near their upper ends to the bore or well 54 in the bit body.

The cutting tooth inserts 66 are brazed or silver-soldered into the slots 63 and 63a, and each insert 66, as shown in FIGS. 14–16, has a flat bottom wall 67, vertical upstanding side walls 68 like the inserts 26, but unlike these inserts 26, the inner end wall 69 of each insert 66 is rounded to mate with the cylindrical end wall 64 of the slots 63 and 63a. The outer end walls 70 of the inserts 66 are rounded to mate with the periphery of the bit head 51a and terminate flush therewith. It will be noted, however, from FIG. 15, that these end walls are slightly tapered inwardly from the apex so that the outer corner of the apex of each insert is radially outward from the bottom face of the inserts. The top of the insert 66 is tapered to provide two side cutting faces 71 inclined about 45° from the side walls 68 and terminating at a flat apex 72 extending longitudinally along the length of the insert. The rounded front end wall 69 is connected with the teeth faces 71 and apex 72 by a bevelled or chamfered front edge 73, and the outer ends of the side edges and apex are connected with the outer end wall 70 by a bevel or chamfer 74.

The inserts 66 fit in the slots 63 to about the depth of the side walls 68 so that the tooth faces 71 project beyond the flat end 58 of the bit body.

As shown in FIGS. 10 and 13, the exposed end face 58 of the bit body is minimal, with narrow rims or lips 75 straddling the sides of the inserts 66 and narrow or thin portions 76 between the inner ends of the inserts and the mouth 57 of the hole 56. These walls, however, are of uniform thickness through the depth of the slots, and afford maximum strength for supporting the inserts.

As also shown in FIG. 10, the insert 66a in the elongated slot 63a shown in FIG. 13 is longer than the rest of the inserts 66 and projects further inwardly than the inserts 66. However, since the hole 56 is eccentrically located in the end face 58 of the bit body, the spacings from the inner ends of the cutting teeth to the hole are fairly equal. The elongated cutting tooth 66a provides for a reduction in the size of the pilot portion that might remain in the rock during a drilling operation. It is not desired, however to extend the elongated tooth 66a beyond the axial center of the bit body.

The bit 50 of FIGS. 10–12 operates in the same manner as the bit 10 of FIGS. 1–3, with the exception that the hole being drilled is larger and that the pilot portion in the center of the drill hole will be smaller because of the elongated tooth 66a.

From the above descriptions it will be understood that this invention provides single pass percussion drill bits having from five to nine wings, each supporting a cutting tooth insert which is rather flat, being wider than deep and longer than wide. The drill bit body has a flat end face offering minimal resistance to flow of chips during the drilling operation. The bit body has ample free draining grooves between the wings which can be provided with flushng holes if desired. The cutting teeth may be equal in length or may be of unequal length, and the teeth are preferably arranged radially around a center hole through the bit body. Since additional cutting edges are provided by the five to nine cutting tooth inserts, increased wear life of the drill bits is made possible, and because the bit body has a flat end face and the inserts are very shallow and amply supported by the flat-faced end of the bit body, appreciable savings in insert material is accomplished without weakening the body support for the inserts.

What I claim is:

1. A single pass percussion rock drill bit comprising a metal bit body having a planar end face with a central bevelled end axial hole therethrough and at least five but not more than nine axially-elongated peripheral grooves spaced circumferentially around the body increasing in depth toward said end face and dividing the end face into the same number of wings, each wing having a shallow slot in the end face open at the periphery of the body and closed adjacent the bevelled end of the hole, a hard cutting material insert having a base bonded in each slot and a bevelled top projecting beyond said end face of the bit body, each insert being wider than deep and longer than wide to provide maximum cutting faces with minimum material, each slot being straddled by a narrow end face portion between a groove and the insert, and each slot having a narrow end wall between the insert and bevelled end of the hole.

2. The drill bit of claim 1 including holes through some of said grooves communicating with the central hole in the bit body.

3. The drill bit of claim 1 wherein the bevelled end of the hole extends into close proximity with the inner ends of all of the slots but does not communicate with said slots.

4. The drill bit of claim 1 wherein each of said inserts is a sintered refractory metal slug with a rectangular base having vertical side walls and end walls of the same depth as the slots, and wherein the bevelled top ends of the inserts are inclined at an angle of about 45° from the side walls.

5. The drill bit of claim 1 wherein the slots have cylindrically curved inner ends and the inserts have mating inner ends.

6. The drill bit of claim 1 wherein the bit body has an enlarged head end providing the end face.

7. A percussion rock drill bit comprising a tubular bit body having a planar end face with a central hole therethrough and axially-elongated tapered grooves spaced circumferentially around the body extending from said planar end face, said grooves having deep, wide ends at said planar end face and converging therefrom to narrow shallow ends substantially spaced from said end face, said grooves providing radially-extending wings in said end face between adjacent grooves, each of said wings having a radial slot extending from the periphery thereof into spaced relation from the central hole, a cutting tooth insert bonded in each slot, and said end face presenting only narrow flat face portions between the inserts, the hole and the grooves.

8. The drill bit of claim 7 wherein one of the inserts and one of the slots is longer than the remaining inserts and slots.

9. The drill bit of claim 7 wherein the hole in the end face is eccentric to the axis of the end face and a plurality of inserts, at least one of which is longer than the others surround the hole in equally spaced relation therefrom.

10. A percussion rock drill bit comprising a tubular metal bit body having a recess for receiving a drill rod in fixed relation to the body and a flat end face, at least five but not more than nine equally-spaced elongated axial slots around the periphery of the bit body extending from said end face and decreasing in thickness and width away from said end face to a level substantially spaced from said end face, each pair of adjacent slots providing therebetween a radially extending wing in the end face, said end face having a central hole therethrough radially inward from said wings, each of said wings having narrow radially extending slots open at their outer ends to the periphery of the bit body and closed at their inner ends in closely spaced relation around the central hole, said slots being shallow and having a width greater than depth and a length greater than width, a sintered hard refractory metal insert slug bonded in each slot, each slug having a base portion with side walls equal to the depth of the slot and with longitudinally-extending tapered top edges converging to a longitudinal apex along the length of the insert, each insert having an inner end face mating with the inner end face of the slot and an exposed outer end face flush with the periphery of the bit body, and each insert having a bevel between the outer end and the tapered side faces.

11. A percussion drill bit comprising (a) an elongated metal bit body with a recessed end for attachment to a drill rod and an opposite head end with a flat end face and a central aperture communicating with the recessed end, elongated axial grooves circumferentially spaced around the bit body dividing the head into at least five wings at said end face, said grooves diverging radially and circumferentially from the periphery of the body at a level substantially spaced from the end face to wide and deep ends at said end face, a shallow cutting tooth insert secured to the end face at each wing having cutting edges projecting beyond the end face and said end face having only narrow rim surfaces between the hole and inserts and between the grooves and inserts.

12. A drill bit comprising a generally cylindrical metal body having a flat end face with at least five cutting teeth projecting therefrom, axially extending grooves between the teeth extending continuously from said end face in the periphery of said body, a central hole between the teeth, said grooves having a radial depth at said end face extending close to said hole, a circumferential width at said end face extending close to adjacent teeth, and converging radially outward and circumferentially inward from said deep and wide ends to the periphery of said body to terminate at levels substantially spaced from said end face, and narrow flat rims of the end face forming the only end face exposed surfaces between the teeth, the hole, and the grooves.

References Cited
UNITED STATES PATENTS

| | | | |
|---|---|---|---|
| 852,745 | 5/1907 | Staub | 175—417X |
| 2,507,222 | 5/1950 | Phipps | 175—418X |
| 2,653,010 | 9/1953 | Curtis | 175—410 |
| 2,800,303 | 7/1957 | Dick | 175—415X |
| 2,879,973 | 3/1959 | Saxman | 175—410 |
| 3,155,180 | 11/1964 | MacSween | 175—418 |

DAVID H. BROWN, Primary Examiner

U.S. Cl. X.R.

175—410, 418